United States Patent [19]
Persinger

[11] Patent Number: 5,989,439
[45] Date of Patent: Nov. 23, 1999

[54] METHOD FOR TREATMENT OF FEED WATER FOR SWINE

[75] Inventor: James Persinger, Hugoton, Kans.

[73] Assignee: Oxion, Inc., Hugoton, Kans.

[21] Appl. No.: 09/087,606

[22] Filed: May 28, 1998

[51] Int. Cl.$^6$ .................................................. C02F 1/78
[52] U.S. Cl. ......................... 210/748; 210/750; 210/760; 210/916
[58] Field of Search .................................... 210/758, 760, 210/916, 748, 750

[56] References Cited

U.S. PATENT DOCUMENTS

| | | | |
|---|---|---|---|
| 5,266,216 | 11/1993 | Agueda et al. | 210/760 |
| 5,415,786 | 5/1995 | Martin et al. | 210/760 |
| 5,772,886 | 6/1998 | Bettle | 210/760 |
| 5,824,243 | 10/1998 | Contreras | 210/760 |
| 5,843,307 | 12/1998 | Faivre et al. | 210/760 |

Primary Examiner—Peter A. Hruskoci
Assistant Examiner—Betsey J. Morrison
Attorney, Agent, or Firm—Frank Frisenda

[57] ABSTRACT

The present invention relates to an improved method for treatment of feed water for swine to reduce odor and water pollution arising from lagoon slurry while at the same time improving live performance and carcass data. The inventive method comprises the steps of a) producing a gaseous mixture supply of ozone and oxygen gas from ambient air; b) effecting directing contact between said gaseous mixture derived from step (a) with a supply of water by means of a venturi injector device to produce a solution of said gaseous mixture and said supply of water; c) continuing said contact between said gaseous mixture and said water supply until the content of ozone in said water supply is within a range of from about 0.5 parts per million to about 10 parts per million, and the content of oxygen is about 80–97% saturation; and d) providing the resultant water supply from step (c) for use as feed water to swine.

4 Claims, 1 Drawing Sheet

METHOD FOR TREATMENT OF FEED WATER FOR SWINE

BACKGROUND OF THE INVENTION

The present invention relates to an improved method for treatment of swine to reduce odor and water pollution arising from lagoon slurry while at the same time improving live performance and carcass data.

In U.S. Pat. No. 4,932,400 the instant inventor disclosed a novel method and apparatus for inhibiting shipping fever in livestock which further improved digestibility of consumed feed. In more detail, the Persinger invention provided a unique method comprising the steps of producing a supply of ozone and nitrous oxide gas from ambient air; effecting direct contact between the ozone and nitrous oxide gas and a supply of water by means of a bubbler device to produce a prescribed hydrogen peroxide-nitrous oxide content; continuing such contact to a prescribed range and providing the resultant water supply for use as feed water to the livestock to be treated. Accordingly, by consumption of the unique resultant solution, the treated livestock was found to have increased digestibility of feed. Such treatment was further found to inhibit the growth of pathogenic organisms, thus inhibiting cattle disease such as shipping fever.

The virtues of treating water with ozone gas has long been recognized. For instance, in U.S. Pat. No. 4,176,061, issued to Stopka, there is described an apparatus and method for treatment of fluid with ozone. As recognized by the Stopka patent disclosure, the ability of ozone to purify drinking water has been appreciated for some time. According to Bringmann, the rate of destruction of bacteria by ozone is one to two orders of magnitude faster than chlorine. Bringmann, G., 1954 Determination of The Lethal Activity of Chlorine and Ozone on *E. Coli*, Zhyg. Infektionskar. 139: 130–139.

Among known treatment solutions it is generally recognized that ozone treatment of water will remove several undesirable substances: including pathogens such as fungi, mercpatans and *E. coli* bacteria, pesticide, etc.

A variety of apparatus is also known for such purposes.

For instance, U.S. Pat. No. 3,726,404 discloses an apparatus for purifying water wherein a batch of water is contained in a tank and fine bubbles of ozone are allowed to rise through the water. Once the batch of water is treated with sufficient amount of ozone, the batch is transferred to a storage tank.

In more detail, one suitable ozone generator means is disclosed in U.S. Pat. No. 4,308,844 issued to James Persinger on Jan. 5, 1982. The apparatus, disclosed in U.S. Pat. No. 4,308,844, comprises an ozone generator cell which acts on ambient air supply. The generator cell produces ozone, oxygen and oxygen ions in the air supply. The generator cell comprises metallic plates and disposed adjacent to one another and separated from each other by a dialectic material and an air gap.

A potential is induced across the adjacent plates and causing ionization of oxygen and nitrogen in the air flowing through the gap which results in the production of ozone gas, nitrous oxide an ionizing air particles.

The popularity of pigs has had its highs and lows throughout history. Various societies revered pigs as godlike animals; others sacrificed them to the gods. At one time they were blamed for carrying leprosy and other diseases. To this day, some religions reject pigs as unclean.

Pigs belong to the order Artiodactyla, which includes many other even-toed animals such as deer, camels, giraffes, antelopes, goats, sheep, and cattle. Most of the animals in this order are ruminants, meaning animals that have complex stomachs and chew their cud. The pig, however, has a single stomach much like our own.

Newborn pigs are about 90% water. As they grow older, about 70% of their body is water. Water is contained in the body cells, the lymph system, joint fluid, blood, and other body fluids. Every day, the pig loses water through its urine, feces, respiration, evaporation from the skin, and sweating.

Water is necessary to dissolve nutrients so that they can be absorbed by the body. Water-soluble wastes are eliminated from the body as urine and sweat. Solid wastes are softened by water in the digestive tract before they are eliminated.

Most of the water that is lost by the body must be replenished, or the pig will become dehydrated. This water is replaced mainly by drinking. Water is also found in all foodstuffs, even grains and pellets that look dry. A pig will drink between about 7 and 20% of its body weight in water each day.

Typically in farm environments, pigs are caged or otherwise confined in pens having a floor of openwork construction to allow animal waste to pass through while maintaining the animals in a dry condition.

Elongated troughs are provided underneath the cages or pens and are positioned for receiving and collecting the animal waste passing through the floors of the cages while facilitating periodic inspection of the animal waste for locating any unhealthy animals and segregating them from the healthy animals. A water supply is provided at a corresponding end of the elongated troughs for periodically directing a stream of wash water along the troughs to flush away the animal waste from below the cages to a slurry pit or lagoon.

Preferably several times a day, valves in the flush water supply pipes are opened and the accumulated waste in the troughs is flushed from the troughs and directed out of the confinement building. A lagoon may be suitably located near the confinement building, and the flush water and waste may be directed from the building and into the lagoon along a suitable channel.

During the time that the pigs are maintained in the cage, the temperature and humidity conditions within the building are controlled and sufficient outside air is introduced into the building to replenish the oxygen supply and to remove odors.

While representing an efficient and effective means for pig rearing, the presence of slurry pits or lagoons represents significant odor and water pollution problems. It has been determined that a significant cause of this odor pollution is ammonia, nitrogen, sulfur, and volatile fatty acid content of the pit slurry waste. Accordingly, those skilled in the art have recognized a significant need to reduce odor and water contaminants in such pit slurry while at the same time improving live performance and carcass data. The present invention fulfills these needs.

SUMMARY OF THE INVENTION

The present invention relates to an improved method for treatment of feed water for swine to reduce odor and water pollution arising from lagoon slurry while at the same time improving live performance and carcass data. The inventive method comprises the steps of:

a) producing a gaseous mixture supply of ozone and oxygen gas from ambient air;

b) effecting direct contact between said gaseous mixture derived from step a) with a supply of water by means of a venturi device to produce a solution of said gaseous mixture and said supply of water;

c) continuing said contact between said gaseous mixture and said water supply until the content of ozone in said water supply is within a range of from about 0.5 parts per million to about 10 parts per million, and the content of oxygen is about 80–97% saturation; and d) providing the resultant water supply from step c) for use as feed water to swine.

DESCRIPTION OF THE PREFERRED EMBODIMENTS

Figure 1:
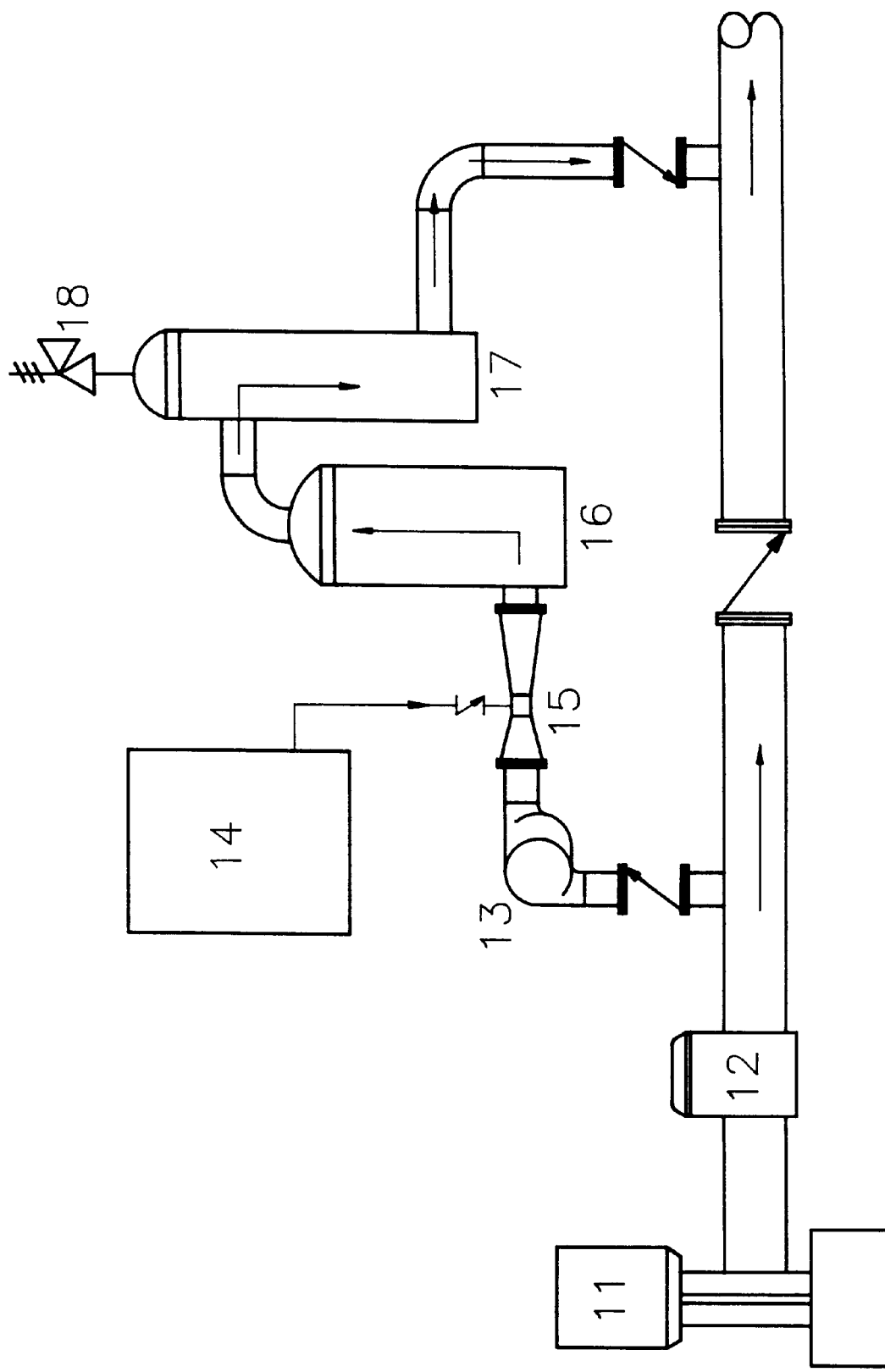
FIG. 1 is a schematic block diagram of one embodied method for treatment of feed water for swine comprising prescribed amounts of ionized air, ozone and oxygen gases in accordance with the present invention.

The present invention relates to an improved method for treatment of swine to reduce odor and water pollution arising from lagoon slurry while at the same time improving live performance and carcass data.

FIG. 1 is a schematic block diagram of one embodied method for treatment of swine by means of the inventive drinking water solution comprising prescribed amounts of ionized air, ozone and oxygen gases in solution in accordance with the present invention. In more detail, as shown in FIG. 1, an ionization unit 14 to venturi injector 15. The ionization unit 14 produces a gaseous mixture of ionized air including about 50 parts per million to about 20,000 parts per million ozone and from about 1,100 parts per million to about 20,000 parts per million oxygen and from about 1,100 to about 25,000 parts per million oxygen ions from ambient air. The water well pump 11, pumps drinking water to pressure tank 12 and fed through pump 13 to venturi injector 15. Direct contact of the gaseous mixture of ionized air derived from ionization unit 14 is admixed in a sub-micron venturi injector 15. The resultant gaseous mixture is further mixed in a mixing chamber 16. The excess gas that is not dissolved is removed from swine feed water by de-gassing separator 17 and vented to atmosphere through de-gas relief valve 18. Thereafter, the resultant gaseous solution is used to treat swine by means of an inventive drinking water solution in accordance with the present invention.

Among known treatment solutions it is generally recognized that ozone treatment of water will remove several undesirable substances: including pathogens such as fungi, mercpatans and *E. coli* bacteria, pesticide, etc.

A variety of apparatus is also known for such purposes.

For instance, U.S. Pat. No. 3,726,404 discloses an apparatus for purifying water wherein a batch of water is contained in a tank and fine bubbles of ozone are allowed to rise through the water. Once the batch of water is treated with sufficient amount of ozone, the batch is transferred to a storage tank.

In more detail, one suitable ozone generator means is disclosed in U.S. Pat. No. 4,308,844, issued to James Persinger on Jan. 5, 1982. The apparatus, disclosed in U.S. Pat. No. 4,308,844, comprises an ozone generator cell which acts on ambient air supply. The generator cell produces ozone, oxygen and oxygen ions in the air supply. The generator cell comprises metallic plates and disposed adjacent to one another and separated from each other by a dialectic material and an air gap.

A potential is induced across the adjacent plates and causing ionization of oxygen and nitrogen in the air flowing through the gap which results in the production of ozone gas, nitrous oxide an ionizing air particles.

In accordance with the present invention, the generator cell produces ozone, oxygen and oxygen ions within the air supply and induces a charge of the mixture by applying an alternating potential of 15,000 volts across the plates. The potential across gap, alternating at a frequency in a range from about 60 to 400 cycles per second, produces ozone gas, nitrous oxide and adds a charge to the air supply.

As described above, the present invention may comprise multiple generator cells, preferably twelve, sequentially connected to produce the desired amount of ionized oxygen.

One suitable ignition transformer for use with the ozone cell is available from Dongan Electric Manufacturing company of Detroit, Mich. The specifications for the preferred ignition transformer is from about 5,000 volts to about 15,000 volts preferably, has 15,000 volts production at 60 cycle.

If the ambient air is excessively wet, or contained polluting particulates, an air dryer and/or air filter may be used to remove excessive components prior to being fed into a compressor or air mover which flows the supply of air to the ozone generator cell.

Typically, the air supplied to the generator cells should have a minimum flow rate of about 4 cubic feet per minute per ozone generator cell. One suitable compressor for this purpose is commercially available from Gast Manufacturing of Bent Harbor, Mich.

ILLUSTRATIVE EXAMPLE

The inventive method is illustrated by the following representative treatment of a swine drinking water solution.

Swine were grown in finishing barns with the normal practices accepted by swine producers, except that about one half of the swine received water that was treated in accordance with the present invention.

Significant improvements were noted in live performance and carcass data, while there was a significant reduction in odor and water pollution.

| Analysis As Received | Untreated | Drinking Water Treated | Change |
|---|---|---|---|
| Slurry Report | | | |
| ORGANIC NITROGEN, ppm N | 212.14 | 186.59 | −12% |
| AMMONIUM - N, ppm N | 1922.84 | 1575.13 | −18% |
| NITRATE, ppm N | 1.96 | .23 | −88% |
| TOTAL NITROGEN, PPM n | 2135.00 | 1761.71 | −17% |
| PHOSPHORUS, ppm P205 | 809.17 | 690.63 | −15% |
| POTASSIUM, ppm K20 | 1328.57 | 1262.21 | −5% |
| SULFUR, ppm S | 139.89 | 124.04 | −11% |
| CALCIUM, ppm Ca | 290.46 | 265.10 | −9% |
| MAGNESIUM, ppm Mg | 97.44 | 102.14 | +5% |
| SODIUM, ppm Na | 341.43 | 279.03 | −18% |
| ZINC, ppm Zn | 10.40 | 9.84 | −5% |
| IRON, ppm Fe | 16.71 | 15.40 | −8% |
| MANGANESE, ppm Mn | 2.95 | 2.83 | −4% |
| BORON, ppm B | 1.62 | 1.48 | −9% |
| SOL SALTS, mmho/cm | 10.67 | 9.38 | −12% |
| pH | 7.29 | 7.21 | −1% |
| ASH, % of Dry Matter | 1.14 | 1.15 | +1% |
| DRY MATTER, % | | | |
| Biological Oxygen Demand mg/L | 5447.86 | 4467.86 | −18% |
| Volatile Fatty Acids, mg//L | 4766.43 | 4118.29 | −14% |

The drinking water was the only thing treated with the inventive gaseous mixture comprising ozone in said water supply is within a range of from about 0.5 parts per million to about 10 parts per million, and nitrous oxide content is within a range of from about 1,000 parts per million to about 40,000 parts million, and the content of oxygen is about 80–90% saturation.

14 pits were sampled.

6 samples per pit mixed together with 1 combined sample being tested.

There were seven (7) treated and seven (7) untreated pits included in this research.

Slurry Report

| Analysis As Received | Untreated | Drinking Water Treated | Change |
|---|---|---|---|
| ORGANIC NITROGEN, ppm N | 1441.50 | 1164.10 | −19% |
| AMMONIUM - N, ppm N | 1996.84 | 1126.90 | −26% |
| NITRATE, ppm N | .14 | .10 | −29% |
| TOTAL NITROGEN, PPM n | 3,438.34 | 2291.00 | −33% |
| PHOSPHORUS, ppm P2O5 | 2430.77 | 1544.47 | −36% |
| POTASSIUM, ppm K2O | 1427.90 | 851.24 | −40% |
| SULFUR, ppm S | 250.14 | 177.20 | −29% |
| CALCIUM, ppm Ca | 946.44 | 665.54 | −30% |
| MAGNESIUM, ppm Mg | 502.60 | 310.57 | −38% |
| SODIUM, ppm Na | 336.30 | 219.37 | −35% |
| ZINC, ppm Zn | 206.81 | 40.83 | −80% |
| IRON, ppm Fe | 83.33 | 77.17 | −31% |
| MANGANESE, ppm Mn | 11.96 | 8.30 | −31% |
| BORON, ppm B | 6.14 | 4.66 | −24% |
| SOL SALTS, mmho/cm | 22.80 | 13.37 | −4% |
| pH | 7.34 | 7.44 | |
| ASH, % of Dry Matter | 2.29 | 1.11 | −52% |
| DRY MATTER, % | | | |
| Volatile Fatty Acids, mg//L | 6268.00 | 3780.00 | −40% |
| Biological Oxygen Demand, mg/L | 10497.00 | 8229.00 | −22% |

CARCASS DATA

| Head | Average Lv wt. | Average Ca. wt. | Actual Yld % | Lean % | 10 rb. bf. | Ln. eye depth |
|---|---|---|---|---|---|---|
| | | | Treated Water | | | |
| 3360 | 297.53 | 227.899 | 76.705 | 51.364 | 0.8136 | 2.322727 |
| | | | Untreated Water | | | |
| 1669 | 274.83 | 211.479 | 77.061 | 50.7 | .82 | 2.32 |

LIVE DATA

| Average Wt. Start | Cull % | Dead % | Light Trans % | Feed Conversion |
|---|---|---|---|---|
| | | Treated Water | | |
| 44.54 | 2.61 | 3.19 | 2.00 | 2.78 |
| | | Untreated Water | | |
| 43.20 | 3.74 | 3.58 | 2.42 | 2.83 |

CARCASS DATA

| Head | Average Lv wt. | Average Ca. wt. | Actual Yld % | Lean % | 10 rb. bf. | Ln. eye depth |
|---|---|---|---|---|---|---|
| | | | Treated Water | | | |
| 3098 | 265.03 | 206.105 | 78.023 | 51.790 | 0.8684 | 2.4263 |
| | | | Untreated Water | | | |
| 2411 | 269.54 | 204.4 | 76.7333 | 51.667 | .88 | 2.42 |

LIVE DATA

| Average Wt. Start | Cull % | Dead % | Light Trans % | Feed Conversion |
|---|---|---|---|---|
| | | Treated Water | | |
| 44.00 | 4.30 | 2.5 | 1.6333 | 2.7767 |
| | | Untreated Water | | |
| 42.33 | 4.87 | 3.3 | 1.6000 | 2.7900 |

I claim:

1. A method for improving swine drinking water to reduce odor and water pollution arising from lagoon slurry while at the same time improving live performance and carcass data, the method comprises the steps of:

a) producing a gaseous mixture supply of ozone and oxygen gas from ambient air;

b) effecting direct contact between said gaseous mixture derived from step a) with a supply of water by means of a venturi injector device to produce a solution of said gaseous mixture and said supply of water;

c) continuing said contact between said gaseous mixture and said water supply until the content of ozone in said water supply is within a range of from about 0.5 parts per million to about 10 parts per million, and the content of oxygen is about 80–97% saturation;

d) removing undissolved excess gas from the resultant water supply derived from step c); and e) providing the resultant water supply from step c) for use as feed water to swine.

2. The method for improving swine drinking water as defined in claim 1 and further comprising the step of drying ambient air to remove excess moisture prior to producing a gaseous mixture supply of ozone and oxygen gas.

3. The method for improving swine drinking water as defined in claim 1 and further comprising the step of filtering ambient air to remove excess particulate matter prior to producing a gaseous mixture supply of ozone and oxygen gas.

4. The method for improving swine drinking water as defined in claim 1 wherein said ambient air is fed to an ionization unit at a minimum flow rate of about four cubic feet per minute to produce said gaseous mixture.

* * * * *